US012797781B2

(12) United States Patent
Menken et al.

(10) Patent No.: US 12,797,781 B2
(45) Date of Patent: Nov. 17, 2026

(54) FRAMED AIR FILTER WITH REINFORCING PLATE

(71) Applicant: 3M INNOVATIVE PROPERTIES COMPANY, St. Paul, MN (US)

(72) Inventors: Fiona E. Menken, Woodbury, MN (US); Jonathan Zich, Burnsville, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 407 days.

(21) Appl. No.: 18/517,188

(22) Filed: Nov. 22, 2023

(65) Prior Publication Data

US 2024/0181377 A1 Jun. 6, 2024

Related U.S. Application Data

(60) Provisional application No. 63/429,690, filed on Dec. 2, 2022.

(51) Int. Cl.
*B01D 46/00* (2022.01)
*B01D 46/52* (2006.01)

(52) U.S. Cl.
CPC ..... *B01D 46/0016* (2013.01); *B01D 46/0005* (2013.01)

(58) Field of Classification Search
None
See application file for complete search history.

(56) References Cited

U.S. PATENT DOCUMENTS

| | | | | |
|---|---|---|---|---|
| 8,702,829 | B2 * | 4/2014 | Lise | B01D 46/0002 55/495 |
| 9,174,159 | B2 | 11/2015 | Sanocki et al. | |
| 9,278,301 | B2 | 3/2016 | Fox et al. | |
| 9,962,640 | B2 | 5/2018 | Fox | |
| 10,328,378 | B2 | 6/2019 | Fox et al. | |
| 11,179,665 | B2 | 11/2021 | Fox et al. | |
| 11,376,537 | B2 | 7/2022 | Menken et al. | |
| 2021/0229022 | A1 | 7/2021 | Zhang et al. | |
| 2021/0229023 | A1 | 7/2021 | Lise et al. | |

FOREIGN PATENT DOCUMENTS

WO 2021191797 A1 9/2021

* cited by examiner

*Primary Examiner* — Gabriel E Gitman

(57) ABSTRACT

A framed air filter that includes air filter media and a frame with four frame portions. At least one corner of the frame is a bonded, non-integral corner at which a reinforcing plate that integrally extends from an elongate downstream flange of a first frame portion of a pair of neighboring frame portions that meet to form the non-integral, bonded corner, is affixed to an inner sidewall of a second frame portion of the pair of neighboring frame portions.

17 Claims, 6 Drawing Sheets

FRAMED AIR FILTER WITH REINFORCING PLATE

CROSS REFERENCE TO RELATED APPLICATIONS

This application claims priority from U.S. Provisional Application Ser. No. 63/429,690, filed 2 Dec. 2022, the disclosure of which is incorporated by reference in its/their entirety herein.

BACKGROUND

Air filters are commonly used in forced air systems, e.g. residential heating and air-conditioning systems and room air purifiers, in order to remove dust and dirt particles and the like.

SUMMARY

Herein is disclosed a framed air filter and method of making. The framed air filter includes air filter media and a frame with four frame portions. At least one corner of the frame is a bonded, non-integral corner at which a reinforcing plate that integrally extends from an elongate downstream flange of a first frame portion of a pair of neighboring frame portions that meet to form the non-integral, bonded corner, is affixed to an inner sidewall of a second frame portion of the pair of neighboring frame portions. These and other aspects of the invention will be apparent from the detailed description below. In no event, however, should the above summaries be construed as limitations on the claimed subject matter, which subject matter is defined solely by the attached claims, as may be amended during prosecution.

Like reference numbers in the various figures indicate like elements. Unless otherwise indicated, all figures and drawings in this document are not to scale and are chosen for the purpose of illustrating different embodiments of the invention. In particular the dimensions of the various components are depicted in illustrative terms only, and no relationship between the dimensions of the various components should be inferred from the drawings, unless so indicated.

Although terms such as "first" and "second" may be used in this disclosure, it should be understood that those terms are used in their relative sense only unless otherwise noted. As used herein as a modifier to a property, attribute or relationship, the term "generally", unless otherwise specifically defined, means that the property, attribute or relationship would be readily recognizable by a person of ordinary skill but without requiring absolute precision or a perfect match (e.g., within +/−20% for quantifiable properties). The term "substantially" means to a high degree of approximation (e.g., within +/−10% for quantifiable properties) but again without requiring absolute precision or a perfect match. The term "essentially" means to a very high degree of approximation (e.g. within +/−4% for quantifiable properties) but again without requiring absolute precision or a perfect match. Terms such as "outer", "outward", "outwardmost", "outwardly", and the like, refer to a direction generally away from the geometric center of the air filter media. Terms such as "inner", "inward", "inwardmost", "inwardly", and the like, refer to a direction generally toward the geometric center of the air filter media.

Figure 1:
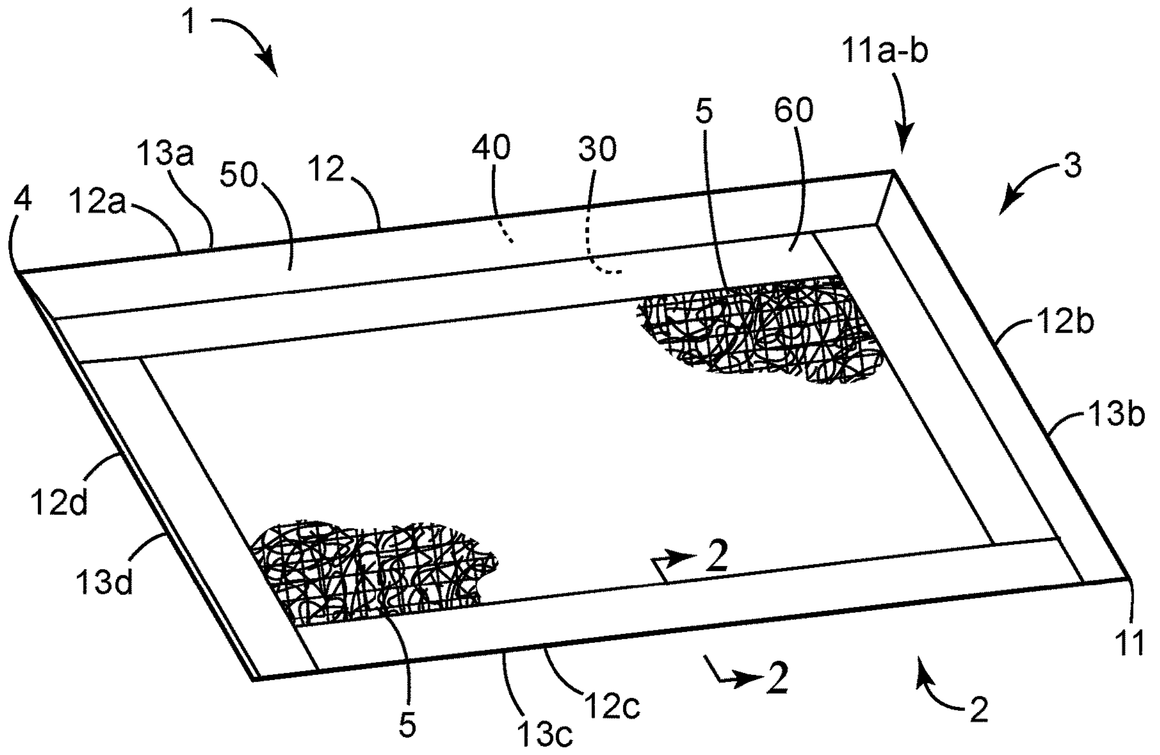
FIG. 1 is a perspective view of an exemplary framed air filter as disclosed herein, viewed from the downstream side of the framed air filter.
Figure 2:
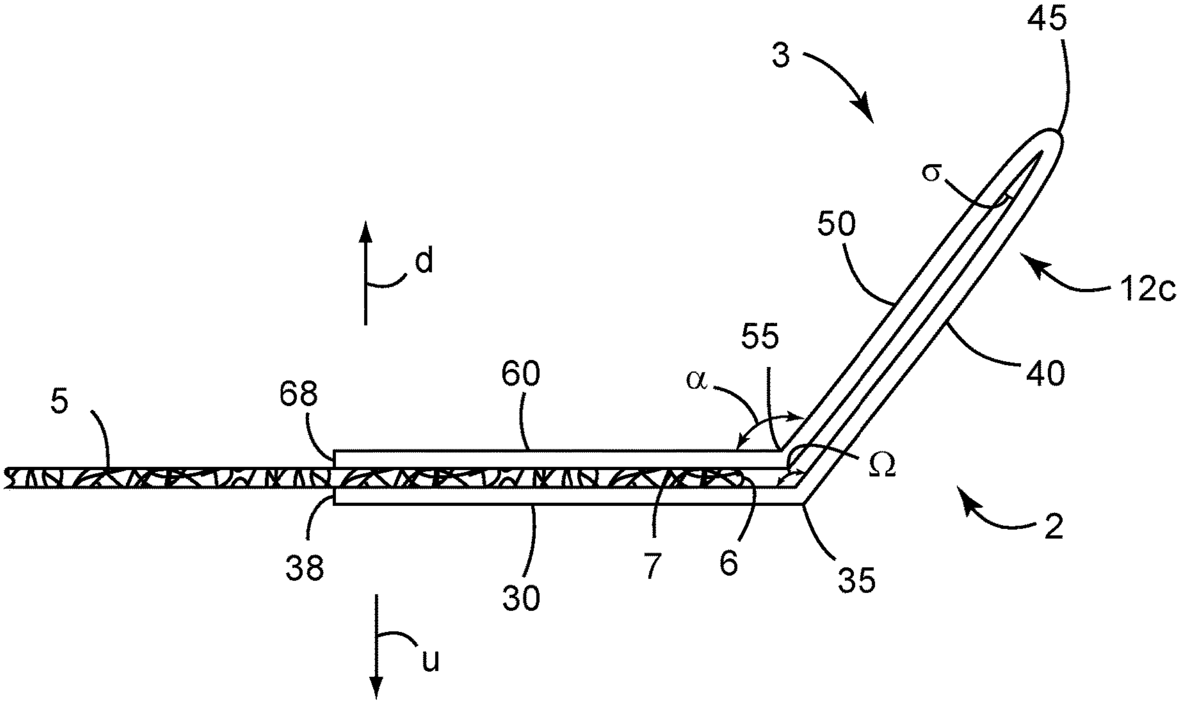
FIG. 2 is a cross-sectional slice view of a portion of the exemplary framed air filter of FIG. 1, taken along line 2-2.
Figure 5:
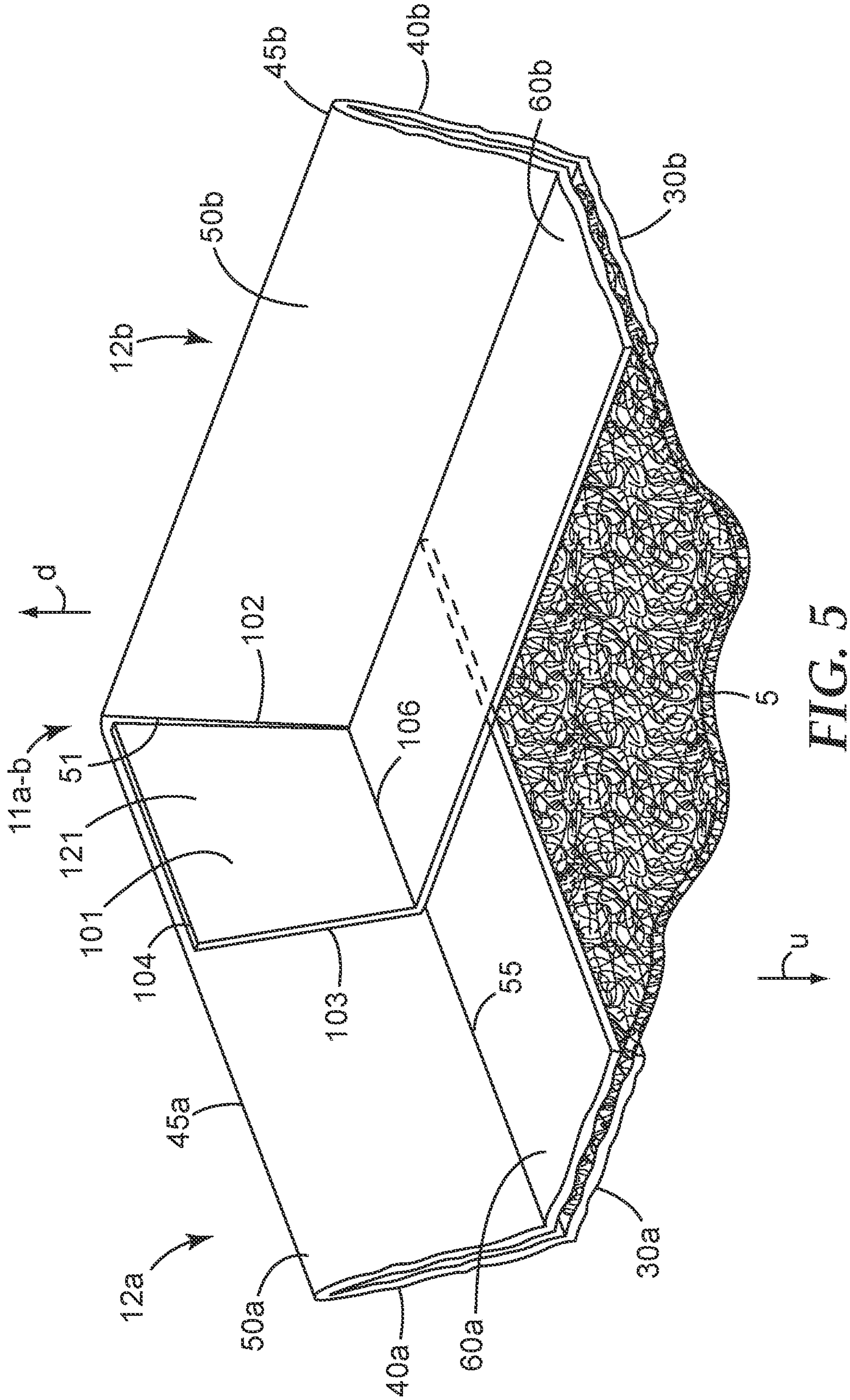
FIG. 5 is a perspective view of a corner of an exemplary framed air filter.

The term "upstream" is used to denote the closed-end side of a framed air filter, corresponding to the far side of filter 1 as shown in FIG. 1 and to the lower side of filter 1 as shown in FIG. 2. The term "downstream" is used to denote the open-ended side of such an air filter (the side to which the filter frame sidewalls protrude away from the major plane of the filter media), corresponding to the near side (the viewed side) of filter 1 as shown in FIG. 1 and to the upper side of filter 1 as shown in FIG. 2. (FIGS. 2 and 5 are marked with "u" and "d" to aid in recognition of upstream and downstream sides of the filter and components.) These terms are used purely for convenience of description herein, in recognition of the observation that such filters are often placed into forced-air ventilation systems with the closed-end side of the filter facing the stream of incoming air (i.e., facing upstream) and with the open-ended side of the filter facing downstream (e.g. with the terminal ends of the sidewalls resting against support flanges of the forced air ventilation system). However, it will be appreciated that in some cases such filters might be placed in an airstream in the reverse orientation; thus, it is emphasized that the terms upstream and downstream are used herein merely for convenience of description of various components of the filter and their geometric relationship, irrespective of how such a filter might be eventually installed into a forced air ventilation system.

Figure 3:
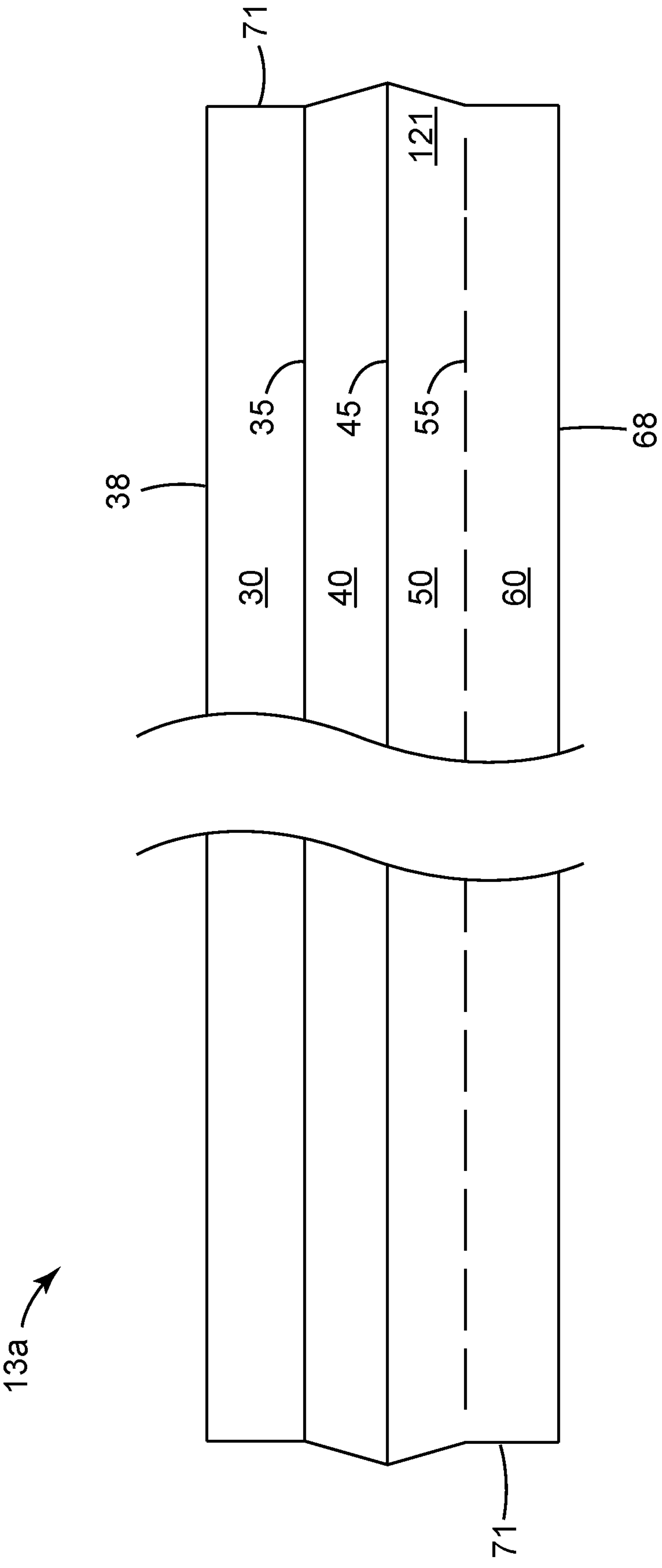
FIG. 3 is a plan view of a portion of an exemplary frame piece that may be folded and assembled with other frame pieces to form a filter frame.
Figure 4:
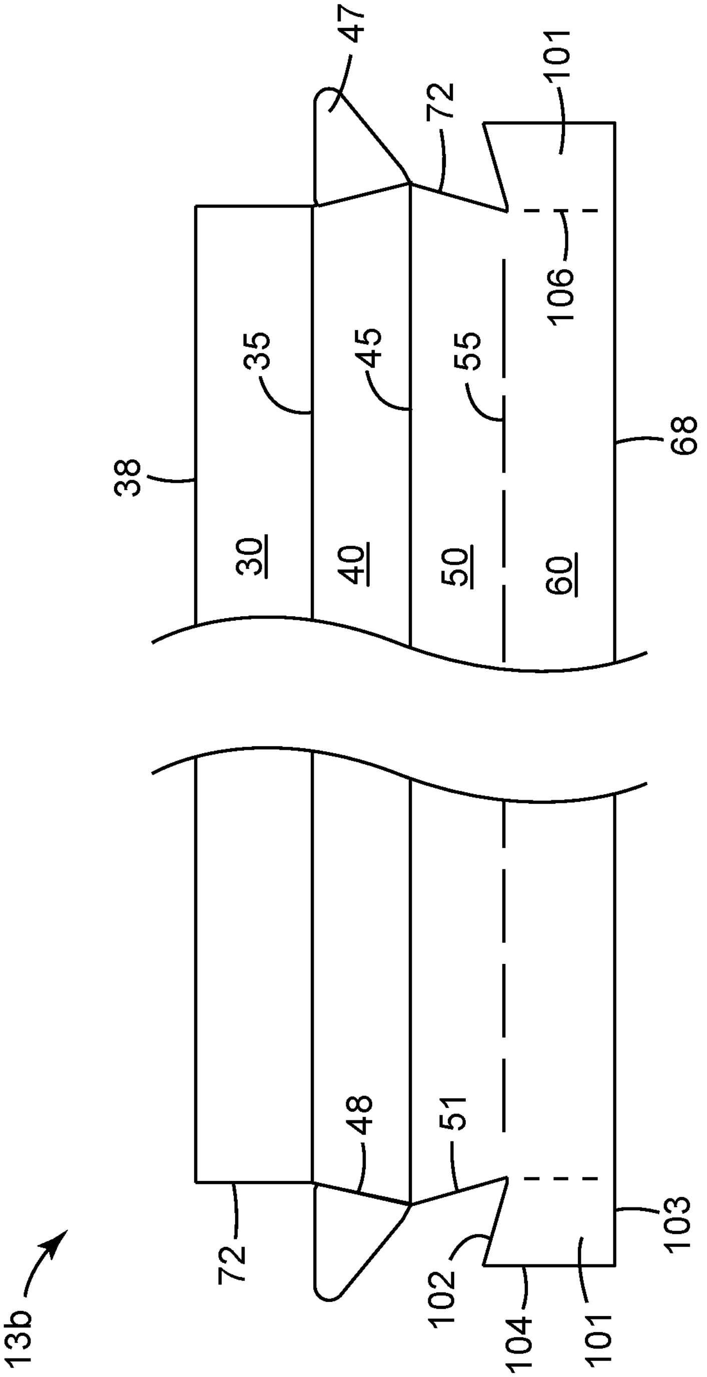
FIG. 4 is a plan view of a portion of another exemplary frame piece that may be folded and assembled with other frame pieces to form a filter frame.

The term "frame portion" is used to denote a portion of an assembled frame that is mounted on a particular edge of the filter media. The term "frame piece" is used to denote a piece of material (that is typically flat as made) that can be folded to form a frame portion and can be joined to other folded frame pieces to form an assembled frame. (Exemplary frame pieces are depicted in FIGS. 3 and 4.) The term "affixed" broadly encompasses any method of joining, whether by the use of adhesive bonding, by mechanical fastening methods such as stapling, or any combination thereof.

DETAILED DESCRIPTION

Shown in FIG. 1 in perspective view generally from the downstream side is an exemplary framed air filter 1 as disclosed herein. Shown in FIG. 2 is a cross-sectional slice view of a portion of the exemplary air filter of FIG. 1, taken along line 2-2 of FIG. 1. Air filter 1 comprises an upstream side 2 and a downstream side 3, as depicted in FIGS. 1 and 2 and as defined and described above. Air filter 1 comprises air filter media 5 and frame 12 mounted generally on, and surrounding, perimeter 6 of filter media 5. Air filter 1 is at least generally rectangular in shape (which specifically includes square shapes) with four corners 4, with filter media 5 thus having a generally rectangular perimeter 6.

For convenience in describing such generally rectangular geometry, the four major portions of frame 12 and components thereof may occasionally be referred to herein by a lettered subscript (e.g., a, b, c, or d). Not all corresponding features of the various frame portions are individually identified by number in the Figures, but will be understood to be present in many embodiments. Similarly, not all components or features will be individually subscripted to denote the particular frame portion in which they are depicted in the various Figures, but it will be understood that all such subscripts can be applied as needed. Frame 12 may thus take the form of a rectangular frame with four major elongate frame portions (12*a, b, c* and *d* as indicated in FIG. 1) that are each mounted on one of the four major edges of the filter media and with pairs of neighboring frame portions meeting to form four corners 11 of frame 12. In some embodiments, opposing frame portions (e.g. 12*a* and 12*c*, and 12*b* and 12*d*) may be identical to each other as discussed later herein.

As most easily seen in FIG. 2, at least one frame portion of frame 12 comprises a downstream flange 60 and an upstream flange 30, which flanges are positioned relatively close to each other (e.g. within 3, 2 or 1 mm) and generally parallel to each other so as to compressively hold border portion 7 of filter media 5 therebetween. Frames of this general type are referred to as pinch frames or compression frames, and are distinguished from e.g. channel frames that exhibit a generally U-shaped profile in which upstream and downstream flanges are relatively far from each other and in which the filter media is not necessarily held with any significant degree of compression. In many embodiments, all four frame portions of frame 12 will be of this pinch-frame design. In some embodiments, an inwardmost edge 68 of downstream flange 60 may be aligned (along an inward-outward direction, as evident in FIG. 2) within e.g. about 4 mm, 2 mm, 1 mm, 0.5, 0.1, or 0.0 mm of an inwardmost edge 38 of upstream flange 30.

Any such portion of frame 12 will further comprise an outer sidewall 40, which extends downstream (and in some embodiments, outward) from upstream flange 30 and is foldably connected thereto at outer junction 35 as shown in FIG. 2. Upstream flange 30 and outer sidewall 40 define an inclination angle Ω with a vertex coinciding with outer junction 35. Inclination angle Ω will, in many embodiments, be greater than 110 degrees, e.g. so that the frame, and the framed air filter as a whole, can be nestable, as discussed in detail later herein. In various embodiments, inclination angle Ω may be at least 115, 120, 130, or 140 degrees. In further embodiments, inclination angle Ω may be at most 160, 150, 145, 135, or 125 degrees. Often, all four frame portions will exhibit similar inclination angles. For example, a nominal inclination angle in the range of 120-130 degrees for all four frame portions may be targeted in production.

The portion of frame 12 further comprises an inner sidewall 50, which extends outward and downstream from downstream flange 60 and is foldably connected thereto at inner junction 55. Downstream flange 60 and inner sidewall 50 define an angle of repose α with a vertex coinciding with inner junction 55. Angle of repose a will, in many embodiments, be greater than 110 degrees, e.g. so that the frame and the framed air filter can be nestable. In various embodiments, angle of repose α may be at least 115, 120, 130, or 140 degrees. In further embodiments, angle of repose a may be at most 160, 150, 145, 135, or 125 degrees. Often, all four frame portions will exhibit similar angles of repose α. For example, a nominal angle of repose α in the range of 120-130 degrees for all four frame portions may be targeted in production. In some embodiments, the angle of repose α of inner junction 55 may be within plus or minus 15, 10, or 5 degrees of the inclination angle Ω of outer junction 35, as for the exemplary design depicted in FIG. 2. However, in other embodiments, the angle of repose α of inner junction 55 may be at least somewhat greater than the inclination angle Ω of outer junction 35, as with the exemplary arrangement depicted in FIG. 7, as discussed below.

The portion of frame 12 is configured so that outer sidewall 40 and inner sidewall 50 meet each other, and are foldably connected to each other, at sidewall junction 45 as indicated in FIG. 2. Outer sidewall 40 and inner sidewall 50 define a sidewall angle σ with a vertex located at sidewall junction 45. Sidewall angle σ may, in many embodiments, be less than 30 degrees. In further embodiments, sidewall angle σ may be at most 25, 20, 15, 10, or 5 degrees. In some embodiments, sidewall angle σ may be at or near zero degrees. In some such cases, the angle of repose α and the inclination angle Ω may be very similar, e.g. so that inner sidewall 50 and outer sidewall 40 are at least generally or substantially parallel to each other as in the exemplary illustration of FIG. 2. In some such embodiments, inner and outer sidewalls 50 and 40 may be positioned very close to each other so that any gap therebetween is quite small, again as illustrated in FIG. 2. In some such embodiments the abutted surfaces of the inner and outer sidewalls may be in contact with each other at least at some locations; and/or, adhesive may be provided on one or both of these surfaces to hold sidewalls 40 and 50 together along at least a portion of their elongate extent.

Figure 7:
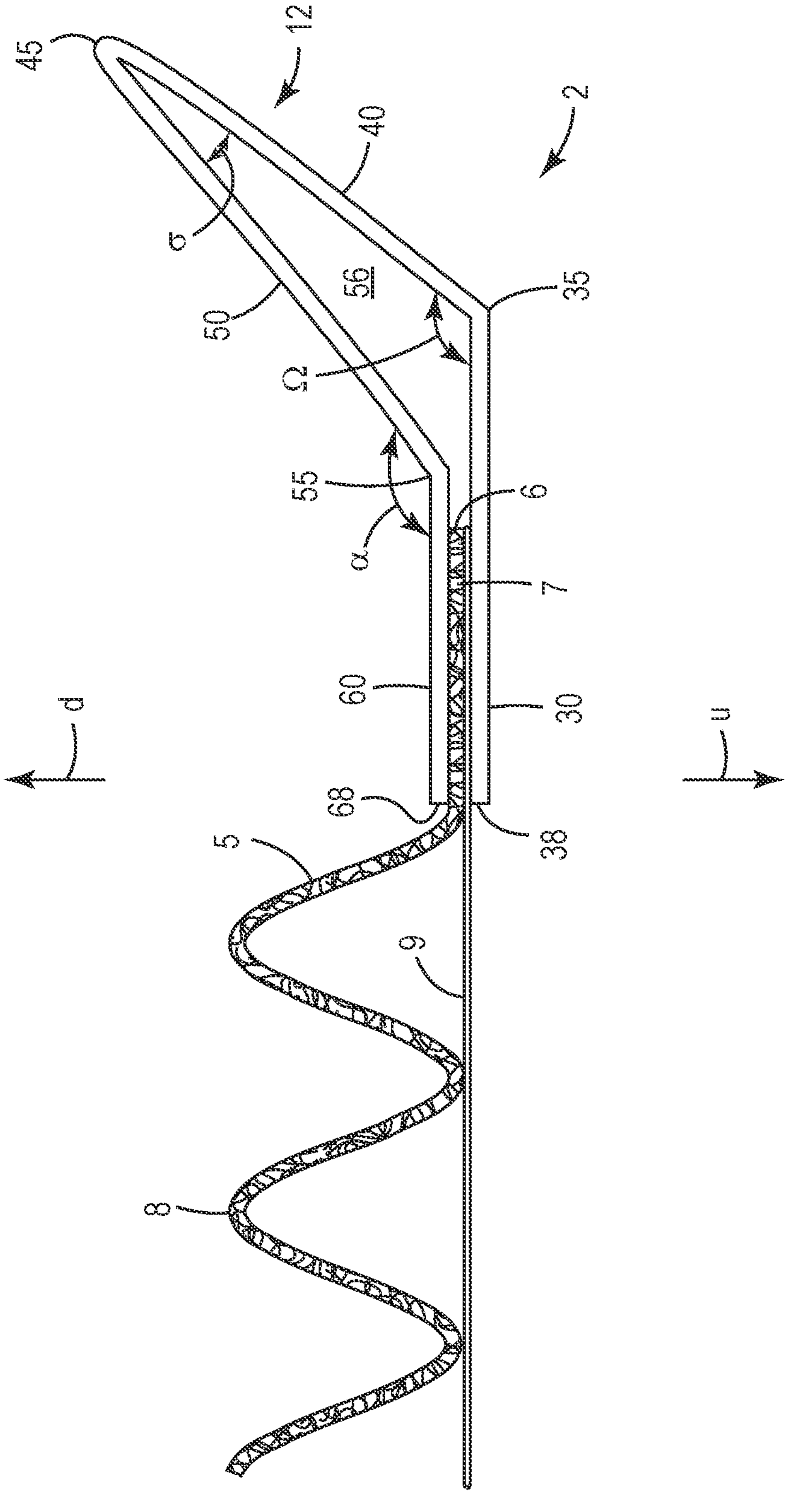
FIG. 7 is a cross-sectional slice view of a portion of another exemplary framed air filter.

However, a nestable arrangement does not necessarily require that inner and outer sidewalls 50 and 40 must be positioned in the manner described above and pictured in FIG. 2 (e.g. with a sidewall angle σ that is very close to zero degrees so that the inner and outer sidewalls are very close to parallel with each other). Rather, in some embodiments, the sidewall angle σ may be noticeably greater than zero, e.g. in a range of 10-20 degrees. An arrangement of this general type is depicted in FIG. 7 (such arrangements are also depicted in FIG. 4 of U.S. Pat. No. 11,179,665, which document is incorporated by reference herein in its entirety). In some such arrangements, the inner and outer sidewalls 50 and 40 may be noticeably non-parallel, e.g. so that the space 56 between these sidewalls exhibits a generally triangular shape, with the gap being the smallest in the vicinity of sidewall junction 45 and being greatest in the vicinity of outer junction 35. In various embodiments, a frame portion with such an arrangement may exhibit a sidewall angle σ that is from e.g. 5, 10, or 15 degrees, up to e.g. 30, 25 or 20 degrees. (By way of a specific example, the arrangement depicted in FIG. 7 exhibits a sidewall angle σ of approximately 15 degrees).

As mentioned above, in some embodiments such an arrangement may exhibit an angle of repose α of inner junction 55 that is at least somewhat greater than the inclination angle Ω of outer junction 35, as is evident for the exemplary arrangement depicted in FIG. 7. Specifically, the exemplary arrangement of FIG. 7 exhibits an angle of repose α of inner junction 55 of approximately 145 degrees, and exhibits an inclination angle Ω of outer junction 35 of approximately 125 degrees. Thus in the depicted exemplary arrangement, the angle of repose α of inner junction 55 is greater than the inclination angle Ω of outer junction 35 by approximately 20 degrees. The absolute values of these angles, and the difference between these angles, may be chosen as desired. In various embodiments, the angle of repose α of inner junction 55 may be greater than the inclination angle Ω of outer junction 35 by a value of from 5, 10 or 15 degrees, up to 40, 35, 30, 25, or 20 degrees.

The above angles (σ, α, Ω) are considered to be "nominal" angles that are e.g. targeted in production. It will be appreciated that in actual production of framed filters, some deviation from these nominal values may occur due to normal variations in manufacturing procedures. Moreover, these angles may vary slightly along the elongate length of a frame portion, with those sections of the frame portion that are closest to the frame corners being more constrained by the rigidifying and bracing action of the frame corners, in comparison to sections of the frame portion that are far away from the frame corners. Thus, in ascertaining whether a frame portion exhibits any of the herein-discussed angles and geometric relationships, a number of measurements may be taken along the elongate extent of the frame portion (and encompassing frame sections that are near the corners, and frame sections that are far from the corners), with an average value of the angle then being calculated.

The framed filter portion depicted in FIG. 7 also differs from the framed filter portion depicted in FIG. 2, in that the framed filter of FIG. 7 comprises an air filter media 5 that is pleated so as to have pleats 8. The air filter media 5 of FIG. 7 also comprises reinforcing members 9, as discussed in more detail later herein. The filter media depicted in FIG. 7 is otherwise similar to the filter media depicted in FIG. 2.

In many embodiments, all four filter frame portions (e.g., 12*a*-12*d*) will comprise the above-recited upstream and downstream flanges and inner and outer sidewalls and junctions/foldable connections therebetween. In this context, the term foldable signifies that a frame portion is formed (i.e. into a folded configuration of the general type shown in FIG. 2) by starting with a frame piece that is flat as made (e.g. of the general type depicted in FIG. 3 or 4), and folding various panels of the frame piece relative to each other along various score/fold lines as described later herein in detail. The term foldable does not denote that the frame portion (or the entirety of frame 12), is foldable in the sense that having been formed, it can then be collapsed or folded flat. In fact, frame 12, once formed and with all corners bonded as disclosed herein, typically will not be collapsible or foldable.

A frame piece can thus be transformed from a flat configuration e.g. of the general type shown in FIG. 3 or 4, into a folded configuration of the general type shown in FIG. 2, by folding the panels of the frame piece along appropriate fold lines that provide foldable connections/junctions between the panels of the frame piece. (Strictly speaking, the panels of a frame piece will not become flanges or sidewalls until the panels are actually folded to form a frame portion. However, such panels of a frame piece may occasionally be referred herein to as flanges or sidewalls for convenience of description.) To facilitate these folding operations, the frame piece can be provided with score lines that cause the frame piece to preferentially fold along the score lines. That is, a fold line is an elongate line that follows (i.e., is dictated by, and thus coincides with) a score line. In many embodiments, such a score/fold line may be at least substantially or essentially follow a straight line (the scoring may be continuous or discontinuous along this straight line). Thus, the above-described inner junction, outer junction, and sidewall junction, can respectively extend along an inner fold line, an outer fold line, and a sidewall fold line, that are respectively defined by an inner score line, an outer score line, and a sidewall score line.

Any of several types of scoring can be used to provide a score line/fold line or a segment thereof. A first type of score line is a cut-scored line. In cut-scoring, the material (e.g. paperboard, chipboard or the like) of a frame piece is cut e.g. with a sharp blade that penetrates partially, but not completely, through the thickness of the frame piece. That is, the cutting blade penetrates into a first, contact surface of the frame piece but stops short of penetrating through to the opposing, second surface. In specific embodiments, a cut-scored line may comprise a depth of penetration of from at least 40, 45, 50, or 55, to at most 80, 75, 70, 65, or 60 percent, of the thickness of the frame piece. The remaining uncut material can act as a hinge allowing the two panels that are connected by the hinge to be foldably moved relative to each other.

A cut-scored line (when viewed in cross-section along the long axis of the score line, prior to folding) typically takes the form of a relatively narrow and high-aspect ratio cut or fissure with relatively little deformation of the material of the frame piece at locations laterally adjacent to the cut and/or on the opposing, second surface of the material. To transform a flat piece of scored material (often referred to as a "blank") into a frame portion, adjacent panels of the blank are usually folded along a cut-scored line in a direction that causes the cut to open wider ("open" folding, as discussed later herein). This is to avoid the faces of the cut-score binding against each other and resisting the folding, as will be readily apparent to ordinary artisans.

A second type of score line is a crush-scored line. In crush-scoring, the material of a frame piece is contacted with a member that is relatively rounded/blunt and/or wide in comparison to a blade used for cut-scoring. Such a crush-scored line (when viewed in cross-section along the long axis of the score line, prior to folding) typically takes the form of a relatively wide and shallow, inwardly-deformed recess on the contact side of the frame piece, with a corresponding outwardly-deformed, rounded protrusion on the opposite side of the frame piece. (In contrast, a cut-score may be only faintly visible, or not visible at all, when viewed from the opposite side of the frame piece.) Adjacent panels are customarily folded along a crush-scored line in a direction that causes the contact-side recess to open wider, for similar reasons to those described above for cut-score lines.

A third type of scoring is perforation. As defined herein, perforating ("perfing") is a process in which successive, spaced apart areas (that are e.g. aligned along a linear path) of frame piece material are cut e.g. with a blade that passes through the entire thickness of the frame piece to leave a through-hole. A perf-scored line thus comprises a succession of through-holes that are spaced apart along a frame piece (in many embodiments, the through-holes will be slit-like with a long axis oriented along the perf-scored line).

By whatever method a score line is provided, such a score line can define a fold line along which two adjacent areas (e.g. panels) of a frame piece will preferentially fold upon the application of appropriate bending force to the areas. A score line will thus be present at (and in fact will define) the junctions between various sidewalls, flanges, etc., in a frame portion that results from the folding process. The various fold lines disclosed herein may make use of any desired score line, chosen e.g. from any of the above general categories. In some embodiments, combinations of score lines of various types may be used. If multiple types of scoring are to be performed, if desired they may all be performed on the same surface of the frame piece and/or at the same time, e.g. using a rotary-scoring apparatus or a batch scoring apparatus. If desired, the outer borders of the frame piece may be cut, e.g. die-cut, in the same operation.

In some embodiments a score line may exhibit segments in which different types of scoring are used. For example, "skip-scoring" may be performed, in which a score line exhibits one or more segments that are cut-scored and one or more segments that are crush-scored. Such arrangements are discussed in detail in U.S. patent Ser. No. 11/376,537, which is incorporated by reference herein in its entirety for the purpose of describing various scoring/folding arrangements. Any of the arrangements disclosed and/or pictured in the '537 patent may be used in combination with any of the arrangements described in the present disclosure. (Various types and/or combinations of score lines may be apparent in certain Figures of the present disclosure; all such depictions are exemplary and the arrangements disclosed in the present document are not limited to use with only the particular types of score lines shown in the Figures.)

As will be evident from FIG. 2, some surfaces of a frame 12 will be interior surfaces that are hidden from view; other surfaces will be exterior surfaces that are visible from at least some viewing perspective. This nomenclature can also be applied to surfaces of frame pieces (noting that, strictly speaking, the condition of visible or hidden will not take effect until the frame piece is folded into a frame portion and assembled into a frame). In some embodiments, surfaces of frame pieces that are to be visible surfaces in the assembled frame, may be e.g. surface-coated to provide an aesthetically pleasing appearance. Often, such a surface coating may comprise a pigment (e.g. a white pigment such as clay, titanium dioxide, barium sulfate, or the like). Additionally or alternatively, the surface may be printed with various indicia, decorations, or the like. In some instances, a printed area (or, the entirety of a visible area) may be coated with a clear topcoating e.g. to provide a glossy appearance. In contrast, the opposing surfaces of frame pieces, that are to be hidden surfaces, may not be visible to any significant extent and thus are often left uncoated and/or unprinted for purposes of economy.

A frame piece may be scored on a hidden surface, and/or on a visible surface, as desired. In many embodiments the scoring may be performed on the visible surface of the frame piece, followed by "open" folding of the frame piece to form a frame portion. As noted above, "open" folding denotes a folding operation that, along the score, causes the opposing faces of the panels to open wider (that is, to move apart from each other, rather than to impinge against each other). Open folding may be applied to a frame piece that was scored on the "visible" surfaces of the frame piece, e.g. so that these surfaces of the frame piece (e.g. surfaces that were coated, printed, etc. for aesthetic effect) are visible surfaces in the finished frame. For example, in some embodiments, fold lines/junctions 35 and 45 as depicted in FIG. 2 may be open folds, with the visible surfaces of sidewalls and flanges 30, 40, 50 and 60 having been aesthetically treated (e.g. surface-coated) in the original blank.

A case in which areas of a frame piece are folded the opposite way, i.e. so that, along the score, the opposing faces of the areas move toward each other (e.g. so as to narrow or close off the groove formed by the scoring), will be referred to herein as "reverse" folding. Such procedures are not commonly performed in the art for reasons noted earlier herein. However, in some instances particular panels of frame pieces may be reverse-folded. In particular, with some pinch/compression frame designs, it may not be possible for all fold lines to be open-folded; rather, at least one fold line, if it is a cut-scored or crush-scored fold line, may need to be reverse-folded. For example, inspection of FIG. 2 reveals that if fold lines 35 and 45 are open-folded as discussed above, then fold line 55 may need to be reverse-folded. However, in some embodiments fold line 55 may be e.g. perforated rather than cut-scored or crush-scored.

In various embodiments, inner sidewall 50 and outer sidewall 40 may be positioned at various sidewall angles $\sigma$ relative to each other (when viewed in cross section as shown in FIG. 2, and as measured from the vertex provided by sidewall fold line/junction 45). Ordinary artisans will appreciate that the sidewall angle of the frame portions, e.g. in combination with other parameters such as the inclination angle $\Omega$ and the angle of repose $\alpha$, can be chosen so that the framed air filter as a whole, is nestable.

By nestable is meant that multiple framed air filters 1 (of at least substantially the same shape and size), can be stacked so that they collectively occupy less than 70% of the total height obtained by multiplying the height of each filter (along the upstream-downstream direction) by the number of filters. A stack of such nested framed filters may resemble the general arrangement depicted e.g. in FIG. 4 of U.S. patent Ser. No. 11/179,665 (noting however that the media need not necessarily be pleated and/or compressible in the manner described in the '665 patent).

It will be appreciated that framed air filters of the type depicted in FIGS. 1 and 2 are nestable; these can be compared to non-nestable frames and framed air filters as depicted e.g. in FIGS. 1 and 2 of U.S. Provisional Patent Application 63/000,013, in the resulting PCT application published as International Patent Application Publication WO 2021/191797, and in the resulting U.S. patent application Ser. No. 17/909,712, all of which are incorporated by reference in their entirety herein.

In some embodiments, the four portions (12*a*-*d*) of frame 12 may be obtained from four individual, separately made frame pieces that are assembled with/connected to each other, and folded, to form frame 12. For example, in the exemplary embodiment of FIG. 1, individual, separately made frame pieces 13*a*, 13*b*, 13*c*, and 13*d* respectively provide frame portions 12*a*, 12*b*, 12*c*, and 12*d*. In some embodiments, a first pair of opposing frame portions 12*a* and 12*c* may be made from a first pair of identical frame pieces (e.g. 13*a* and 13*c*); similarly, a second pair of opposing frame portions 12*b* and 12*d* may be made from a second pair of frame pieces (13*b* and 13*d*) that are identical to each other (and that are different from frame pieces 13*a* and 13*c*). The pairs of opposing frame pieces/portions will be arranged in alternating sequence around the perimeter of the filter media, as shown in FIG. 1. Such an arrangement will provide a frame in which all four corners of the frame are bonded corners and no corner of the frame is an integral corner, as discussed in detail later herein.

In other embodiments, one frame piece may provide two neighboring frame portions (e.g. 12*a* and 12*b*) and another frame piece may provide the two remaining neighboring frame portions (e.g. 12*c* and 12*d*). Such a frame piece may take the form of (e.g. after partial folding) an L-shaped frame piece in which the two arms of the L are integrally joined to each other by an integral, foldable connection e.g. between the outer sidewalls of the arms of the L. Such arrangements will provide a frame in which at least one corner of the frame is an integral corner (rather than a bonded corner). For example, such a frame may thus comprise two diagonally-opposing frame corners that are integral corners and two remaining diagonally-opposing frame corners that are bonded corners.

A frame portion will be formed via the folding of foldably-connected, elongate panels of at least a part (or the entirety) of a frame piece. An exemplary frame piece 13*a* from which can be formed a frame portion of the general type shown in FIG. 2, is depicted in exemplary representation in FIG. 3. The frame piece will be elongate as is evident from FIG. 1; however, in FIG. 3 a central portion of the frame piece is omitted so that the ends of the frame piece can be viewed in greater detail. (The same is true for frame piece 13*b* of FIG. 4.)

Frame piece 13*a* of FIG. 3 comprises panels 30 and 60 that, upon folding, will respectively form the upstream flange and the downstream flange of the resulting frame portion. Terminal edges 38 and 68 of the frame piece will form corresponding edges 38 and 68 of the thus-formed flanges. The frame piece further comprises panels 40 and 50 that will respectively form the outer and inner sidewalls of the frame portion.

Panels 30 and 40 are joined to each other by a score/fold line that, when the panels are folded along the score line, will provide outer junction 35. Panels 50 and 60 are similarly joined to each other by a score/fold line that, when the panels are folded along the score line, will provide inner junction 55. Panels 40 and 50 that will form the outer and inner sidewalls, are joined by a score/fold line that, when the panels are folded along the score line, will form sidewall junction 45. Exemplary frame piece 13*b* as shown in FIG. 4, comprises panels 30, 40, 50, and 60, and junctions 35, 45 and 55 in similar manner to panels 30, 40, 50, 60, and junctions 35, 45 and 55 of frame piece 13 of FIG. 3, and can be folded in a similar manner to form a frame portion. The differences between frame pieces 13*a* and 13*b* are discussed in detail later herein.

As noted, in some embodiments one or more corners 11 of frame 12 may be an integral corner in which at least some part of the respective frame portions are integrally connected to each other. For instance, a type of integral corner that is commonly used in the art comprises a pair of neighboring frame portions in which the outer sidewalls of the two frame portions are integrally connected to each other.

However, one or more corners 11 of frame 12 will be a bonded corner. In various embodiments, two or three such corners may be bonded corners; in some embodiments, all four corners may be bonded corners. By definition, a bonded corner is a non-integral corner in which no part of the two frame pieces that meet to form the corner, are integral with each other as made. Rather, some part or parts of the first frame piece/portion are bonded (affixed) to some part or parts of the second frame piece/portion in the process of forming the frame. As discussed in detail herein, one such part that is bonded in this manner may be a reinforcing plate of one of the frame portions.

Two frame pieces can be brought together, folded to form neighboring frame portions, and assembled to each other to form a corner, e.g. in the following general manner. As an example, the formation of corner 11*a-b* (as shown in the upper right of FIG. 1, and as shown in magnified view in FIG. 5) from frame portions 12*a* and 12*b* will be discussed. Frame portions 12*a* and 12*b* can be respectively obtained from frame pieces 13*a* and 13*b* as depicted in FIGS. 3 and 4. Frame piece 13*a* can be folded in the general manner described earlier herein, to form a frame portion 12*a* whose right-hand end has the general configuration shown in FIG. 5. Frame piece 13*b* can be similarly folded, to form a frame portion 12*b* whose left-hand end has the general configuration shown in FIG. 5. The frame portions can be brought together e.g. so that one or more end portions of one frame piece/portion is overlapped with one or more end portions of a second, neighboring frame piece/portion.

Such a corner can be held in the desired configuration in any desired manner. Typically, at least some portions of the first frame portion and the second frame portion are affixed to each other to achieve this. In some embodiments, this may be done via mechanical fastening, e.g. by the use of staples or similar fasteners. However, in many convenient embodiments, this may be performed by adhesive bonding. Thus in some embodiments, a layer of adhesive of any suitable type may be disposed on at least a portion of, for example, the hidden surfaces of one or more frame pieces. In some embodiments, such an adhesive may be coated over the entirety of the hidden surface of a frame piece. However, it may be more efficient to provide adhesive only at the locations at which it is needed for bonding.

Reinforcing Plate

Figure 6:
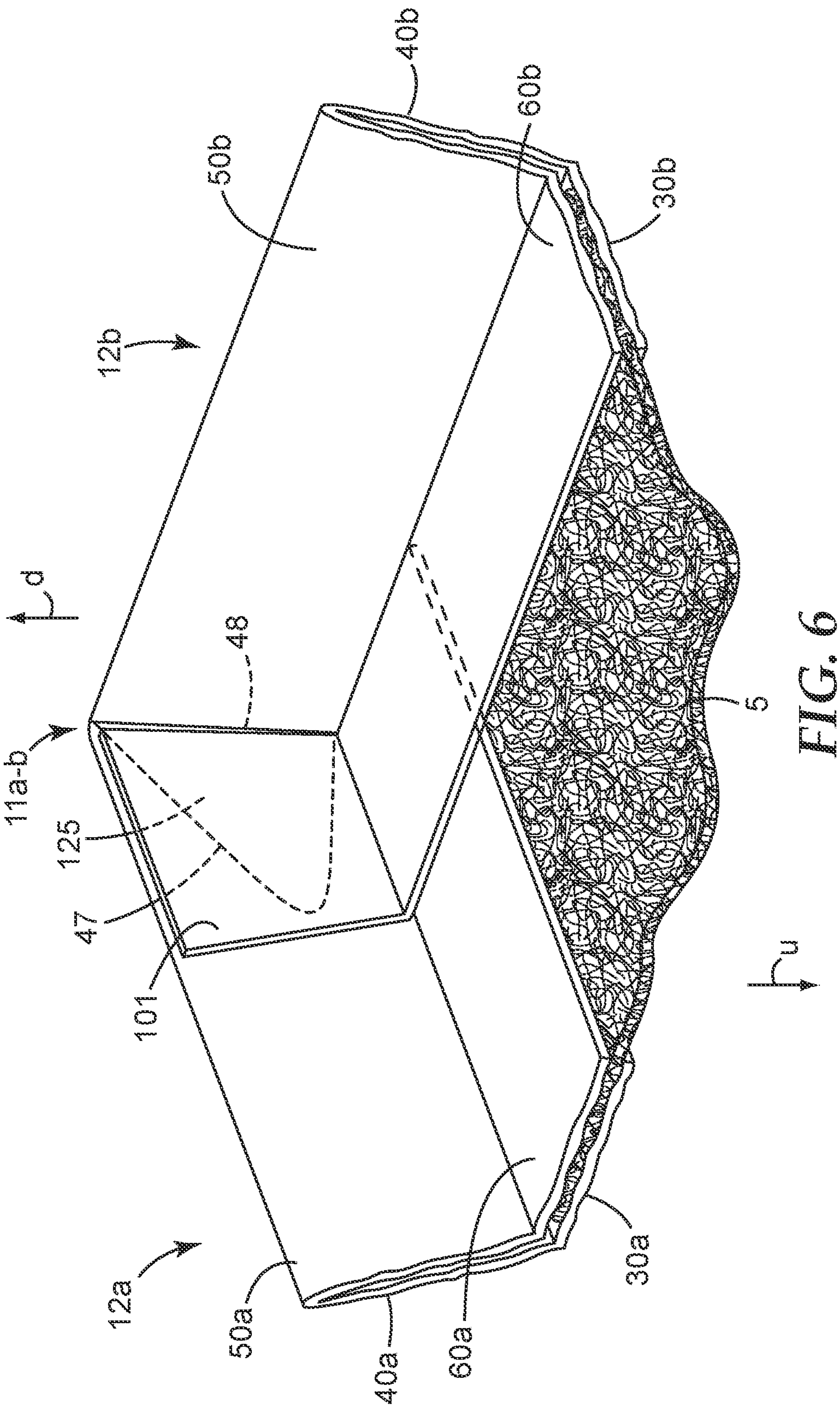
FIG. 6 is another perspective view of a corner of an exemplary framed air filter.

At a bonded corner, at least one part of a frame portion will be affixed to a neighboring frame portion at the corner formed by the two portions. In some embodiments, one such affixable part will be a reinforcing plate. Exemplary reinforcing plates 101 are depicted in FIG. 4 as they may appear in frame pieces, and are depicted in FIGS. 5 and 6 as they may appear in an assembled frame. (Reinforcing plates are not visible in the view of FIG. 1.) By definition, a reinforcing plate 101 as disclosed herein integrally extends from a downstream flange 60 of a first frame portion 12*b* of a pair of neighboring frame portions 12*b* and 12*a* that meet to form a corner 11*a-b* of the frame. The reinforcing plate 101 can be positioned in inward, substantially coplanar relation with a corner-proximate bonding area 121 of inner sidewall 50*a* of second frame portion 12*a*. (In other words, when framed filter 1 is viewed from the downstream side, plate 101 is visible atop an end area of the inward surface of inner sidewall 50*a* of frame portion 12*a*.) Plate 101 can be affixed to area 121 of second frame portion 12*a*, in any known manner. In many convenient embodiments, this may be achieved by adhesive bonding as discussed later herein.

The use of a reinforcing plate of this general type can advantageously enhance the mechanical stability of the thus-formed corner. In particular, the use of reinforcing plates at one, two, three, or all four corners of a frame, can significantly increase the resistance of the framed filter to out-of-plane twisting. While in some embodiments the mechanical strength of the frame may be further enhanced by the use of optional reinforcing tabs as described elsewhere herein, it is emphasized that the use of one or more reinforcing plates is not predicated on being used in combination with reinforcing tabs.

As seen in FIG. 4, reinforcing plate 101 integrally extends from an end of downstream flange 60 of first frame piece 13*b* (and thus of the resulting first frame portion 12*b*) and is integrally, foldably connected to the end of downstream flange 60 of first frame portion 12*b* by a fold line 106. Fold line 106 provides that, when the frame pieces are assembled together to form a bonded corner, plate 101 can be folded so that it can be positioned in inward relation to the inner sidewall 50 of the neighboring frame piece as described above. In many embodiments, fold line 106 may be oriented at least generally or substantially perpendicular to the long axes of the above-mentioned fold lines 35, 45, and 55 (and, to the long axis of the frame piece as a whole), as is evident from FIG. 4. In the assembled frame portion, fold line 106 may be at least substantially aligned with (and, in fact, may be inwardly abutted against) fold line 55 of the neighboring frame portion 12*a*, along the entire length of fold line 106, as shown in FIG. 5.

Thus in some embodiments, an inner junction 55 between the elongate inner sidewall 50*a* and the elongate downstream flange 60*a* of a second, neighboring frame portion 12*a* may exhibit an angle of repose α of e.g. from 110 degrees to 160 degrees. The fold line 106 between reinforcing plate 101 and the end of elongate downstream flange 60*b* of the first frame portion (from which the reinforcing plate integrally, foldably extends) may exhibit a reinforcing plate angle that is at least generally congruent with (e.g., is within plus or minus 10, 5, or 2 degrees of) the angle of repose α of the inner junction 55 of the second, neighboring frame portion. This can allow plate 101, as folded along fold line 106, to extend upward and outward along the inner surface of corner-proximate bonding area 121 of inner sidewall 50*a* of the neighboring frame portion 12*a* while remaining closely abutted against this inner surface of area 121, as is evident from FIG. 5.

Thus in the assembled filter frame, substantially or essentially all of the area of reinforcing plate 101 of first frame portion 12*b* may closely abut, e.g. reside upon, the inward surface of corner-proximate bonding area 121 of inner sidewall 50*a* of the neighboring frame portion, as is evident from FIG. 5. In various embodiments, some or substantially all of this area of plate 101 may be bonded, e.g. adhesively bonded, to area 121 of inner sidewall 50*a*.

A reinforcing plate 101 may comprise any desired shape and/or size. In some embodiments, a corner-facing side-edge 102 of reinforcing plate 101 (as identified in FIGS. 4 and 5) may be angled so that it is not strictly aligned with the long axes of fold lines 35, 45 and 55. Such an angled arrangement of side-edge 102, which is depicted in FIG. 4, can allow side-edge 102 to reside very close to the corner 11*a-b* (i.e. to the meeting-line of inner sidewall 50*b* of frame portion 12*b* with inner sidewall 50*a* of frame portion 12*a*). Such an arrangement is evident in FIG. 5. Thus in some embodiments, side-edge 102 may be at an angle that is oriented at least 5, 10 or 15 degrees away from the long axes of fold lines 35, 45 and 55. In further embodiments, this angle may be at most 30, 25, or 20 degrees. However, such arrangements are not strictly necessary, and in some embodiments side-edge 102 does not need to be positioned as close to corner 11*a-b* as shown in the exemplary illustration of FIG. 5. Nor does this side-edge 102 need to necessarily be perfectly straight.

Similarly, opposing side-edge 103 of reinforcing plate 101 may be essentially straight and aligned with fold lines 35, 45 and 55; however, in some embodiments it may be at an off-angle relative to these fold lines. Also, it does not necessarily need to be straight. Similarly, downstream edge 104 of reinforcing plate 101 may be straight and/or may closely approach junction 45*a* of second sidewall portion 12*a*, but this need not necessarily be the case.

As noted above, a reinforcing plate 101 integrally extends from an end of downstream flange 60 of first frame portion 12*b* and is integrally, foldably connected to the end of downstream flange 60 of first frame portion 12*b* by a fold line 106. As defined herein, a reinforcing plate will not integrally extend from (nor be connected to by a fold line) any other flange or sidewall of the first frame piece/portion besides the downstream flange 60. Specifically, a reinforcing plate will not have any portion that extends from the elongate inner sidewall 50*b* of the first frame portion 12*b*. Rather, the elongate inner sidewall 50*b* of the first frame portion 12*b* will terminate at a terminal end 51 that is positioned at the corner of the frame (as indicated in FIG. 5) and that does not extend along any portion of the elongate inner sidewall 50*a* of the second, neighboring frame piece. Thus in at least this respect, a reinforcing plate 101 as disclosed herein differs from, and is distinguished from, a stabilizing flap of the type described in the above-mentioned U.S. Provisional Patent Application 63/000,013, the resulting PCT application published as International Patent Application Publication WO 2021/191797, and the resulting U.S. patent application Ser. No. 17/909,712.

A reinforcing plate 101 of a bonded corner as disclosed herein is also distinguished from, for example, a folded flange or flap of the general type disclosed e.g. in U.S. Pat. No. 9,962,640. A folded flap of the general type disclosed in the '640 patent is typically present at an integral corner that results from manipulating the segments of an L-shaped frame piece to provide two frame portions joined at the integral corner. The folded flap results from folding end areas of two segments of frame material together (so that the resulting flap comprises two layers of frame material rather than one) at the corner in order to deal with excess frame material that converges at the integral corner. In other words, such an approach basically involves forming a "dart" in the frame pieces so that an integral corner can be more easily formed. In contrast, the presently-disclosed reinforcing plate comprises a single layer of frame material rather than two layers. Furthermore, a reinforcing plate is at a bonded corner and does not serve the purpose of dealing with excess material at an integral corner.

In some embodiments in which fold line 106 is achieved by cut-scoring, arranging a reinforcing plate 101 in the manner described above may require that plate 101 be "reverse-folded" (relative to downstream flange 60 from which it extends) along fold line 106. This may not cause unacceptable consequences, because in many embodiments reinforcing plate 101 does not necessarily need to be rotated through a very large folding angle in order to reside in inward, substantially coplanar relation with a corner-proximate bonding area 121 of inner sidewall 50*a* of second frame portion 12*a*. Rather, plate 101 need only be folded along fold line 106 through a folding angle (e.g. in the range of 40-60 degrees) that will allow it to match the angle of repose α of the inner sidewall 50*a* of the second frame portion. However, in some embodiments, fold line 106 may be scored by e.g. perforation or crush-scoring rather than by cut-scoring.

In some embodiments, two, three or all four corners of frame 12 may comprise reinforcing plates of the general type described above. The above descriptions will thus apply in similar manner to any such corners. The frame pieces from which such a frame is made can be configured in any suitable manner. For example, in some embodiments each of the four frame pieces may comprise a reinforcing plate at one end and no reinforcing plate at the other end. However, in some embodiments, it may be convenient to use a pair of opposing frame pieces that each have reinforcing plates at both ends (e.g. as in frame piece 13*b* of FIG. 4), in combination with another pair of opposing frame pieces that each do not have reinforcing plate at either end (e.g. as in frame piece 13*a* of FIG. 3). In some embodiments e.g. in which a rectangular frame is not square in shape, the pair of longer opposing frame pieces may comprise reinforcing plates (as well as reinforcing tabs as described below) while the pair of shorter opposing frame pieces may comprise neither reinforcing plates nor reinforcing tabs. In other words, in some embodiments the longer frame pieces may be arranged in the general manner depicted in FIG. 4, with the shorter frame pieces being arranged in the general manner depicted in FIG. 3.

In some embodiments, a part of a frame piece/portion that is bonded to a neighboring frame piece may be an optional reinforcing tab. Such a tab may be used e.g. in addition to an above-described reinforcing plate. Exemplary reinforcing tabs 47 as they may appear on a frame piece (before being folded/assembled into a frame) are shown in FIG. 4. Such a tab may extend integrally e.g. from the outer sidewall 40 of a first frame portion of a pair of neighboring frame portions that meet to form a corner, and may be bonded to an outer sidewall of a second frame portion of the pair. For example, a reinforcing tab 47 may integrally (and foldably) extend from the outer sidewall 40 of a first frame portion by way of a tab fold line 48 as shown in FIG. 4. In assembly of frame 12, tab 47 can be folded around the frame corner so that it is in coplanar overlapping relation with a corner-proximate bonding area 125 (indicated in FIG. 6) of the outer sidewall 40 of the second frame portion. Tab 47 can be affixed to area 125 in any desired manner, e.g. by adhesive bonding.

Such an arrangement is shown in exemplary manner in FIG. 6, in which a tab 47 that integrally extends from outer sidewall 40*b* of frame portion 12*b* and is foldably connected to outer sidewall 40*b* by tab fold line 48, is folded around the frame corner 11*a*-*b* to be in coplanar overlapping relation with corner-proximate bonding area 125 of outer sidewall 40*a* of neighboring frame portion 12*a*. Tab 47 may be e.g. adhesively bonded to area 125. In the particular arrangement of FIG. 6, tab 47 is in outwardly overlapping relation with area 125, which may be convenient e.g. in automated assembly of such a frame. However, in some embodiments tab 47 may be in inwardly-overlapping relation with area 125 (i.e., tab 47 could be tucked in between the outer and inner sidewalls of the neighboring frame piece rather than being positioned outward of the outer sidewall).

The fold line 48 may be angled (as evident in FIG. 4) to allow tab 47 to "wrap" around corner of a frame, in view of the angle of repose to be exhibited by the frame. In various embodiments, fold line 48 may be oriented at an angle that is at least 5, 10 or 15 degrees away from perpendicular to the long axes of fold lines 35, 45, and 55. In further embodiments, fold line 48 may be oriented at an angle that is no more than 30, 20, or 10 degrees away from perpendicular to the long axes of fold lines 35, 45 and 55. By way of a specific example, fold line 48 as depicted in FIG. 4, is oriented at an angle of approximately 15 degrees away from perpendicular to the long axes of fold lines 35, 45 and 55. In some embodiments, a terminal end 51 of inner sidewall 50 may be oriented at a similar (although opposite) angle from fold line 48. In some embodiments, this end 51 of inner sidewall 50, and fold line 48 that connects tab 47 to outer sidewall 40, may be substantially mirror images of each other as shown in FIG. 4. Such an arrangement can allow the terminal edge of end 51 of inner sidewall 50, and the terminal "end" of outer sidewall 40 (in the form of fold line 48) to align with each other along the desired angle of inclination/repose at the frame corner, with the fold line 48 positioned so that tab 47 can wrap around the frame corner in the desired manner.

The presence of such a reinforcing tab may further enhance the mechanical strength of a frame corner and/or it may minimize the ability of air to leak through the frame corner. In some embodiments, all four corners of frame 12 may be a tabbed corner of this general type. The frame pieces from which such a frame is made can be configured in any suitable manner. For example, in some embodiments each of the four frame pieces may comprise a tab at one end and no tab at the other end. However, in some embodiments, it may be convenient to use a pair of opposing frame pieces that each have tabs at both ends (e.g. as in frame piece 13*b* of FIG. 4), in combination with another pair of opposing frame pieces that each do not have tabs at either end (e.g. as in frame piece 13*a* of FIG. 3). In some embodiments a first pair of opposing frame pieces may have both reinforcing plates and tabs (as in FIG. 4); and, a second pair of opposing frame pieces may have neither reinforcing plates nor tabs (as in FIG. 3).

In some embodiments, frame pieces may be provided in identical pairs that are in opposing relation to each other. For example, a frame may comprise two opposing frame pieces of the general type shown in FIG. 3; and, two additional opposing frame pieces of the general type shown in FIG. 4. In this regard, it is noted that various components, areas and features are indicated at the left or right end of frame pieces 13*a* and 13*b* as depicted in FIGS. 3 and 4. Such components, areas and features may be, and typically are, also present at the other end of the frame piece, but are not all indicated by number in order to avoid undue clutter in the Figures.

The arrangements disclosed herein can allow the use of frame pieces that are relatively simple in design and are amenable to straightforward scoring, folding, and assembling, in comparison to various complex frame arrangements that are known in the art. This is exemplified by frame piece 13*a* as depicted in FIG. 3. As is evident from inspection of FIG. 3, in at least some embodiments a frame piece 13*a* may comprise opposing terminal ends 71 (which will become terminal ends 51 in the frame formed from the frame piece, as discussed earlier herein). In some embodiments, the edges of these opposing terminal ends 71 may be oriented relatively close to being perpendicular to the long axis of the frame piece, with few deviations or interruptions. Such terminal ends may, for example, be oriented within plus or minus 45, 30, 20, 15, or 10 degrees of perpendicular to the long axis of the frame piece. In some embodiments, the terminal ends of panels 40 and 50 may be slightly angled in the general manner described above (while e.g. remaining within these overall limits of the panel ends being within plus or minus 45, 30, 20, 15 or 10 degrees of perpendicular to the long axis of the frame piece). Such arrangements can provide that the ends of the outer and inner sidewalls 40 and 50 formed from these panels, establish the desired angle of inclination and repose.

Similarly, in at least some embodiments a frame piece 13*b* as depicted in FIG. 4 may comprise opposing terminal ends 72 with edges that (except for where interrupted by a reinforcing plate 101 and by a reinforcing tab 47, if present) are oriented relatively close to being perpendicular to the long axis of the frame piece. In various embodiments, the terminal ends of all panels of a frame piece 13*b* will be oriented within plus or minus 45, 30, 20, 15, or 10, degrees of perpendicular to the long axis of the frame piece. In such cases, the above-discussed fold line(s) 106 of reinforcing plate 101, and fold line(s) 48 of optional reinforcing tab 47, if present, will be considered to respectively constitute the "end" of panels 60 and 40, for purposes of such an analysis.

The elongate length of frame pieces (along a left-right direction of FIGS. 3 and 4) may be chosen so that a framed filter of a desired nominal size (e.g., nominal 20"×20", 20"×25", etc.) may be assembled therefrom. The width (along an up-down direction of FIGS. 3 and 4) of a frame piece and of individual panels thereof may be chosen as desired. The widths of the various panels may be chosen in view of the various angles that are to be established and in particularly in view of whether or not the resulting frame is to be nestable. In some embodiments, the width of downstream flange 60 may be about 80-98% of the width of upstream flange 30. In some embodiments, the width of inner sidewall 50 may be about 80-98% of the width of outer sidewall 40. In embodiments of the general type depicted in FIG. 2, the widths of the inner and outer sidewalls may be quite similar to each other and the widths of the upstream and downstream flanges may be quite similar to each other, both as evident in FIG. 2. In embodiments of the general type depicted in FIG. 7, the width of the inner sidewalls may be significantly greater than that of the outer sidewalls and the width of the upstream flanges may be significantly greater than that of the downstream flanges, both as evident in FIG. 7. The overall filter "height" in the upstream-downstream direction will be dictated by the widths of sidewalls 40 and 50 in combination with the angles of inclination and repose. These parameters can be set to e.g. provide a nominal X"×X"×1" (height) framed filter.

Frame pieces 13*a* and/or 13*b* may be made of any suitable material, e.g. paperboard, plastic, and so on, into which may be imparted score/fold lines as described herein. In particular embodiments, frame pieces may be made of paperboard of thickness in the range of 20-30 thousandths of an inch. In specific embodiments, frame pieces may be made of single-layer paperboard rather than corrugated paperboard. However, in some embodiments any suitable material (e.g. multilayer paperboard) may be used. As noted, paperboard that is used in frame pieces is often coated (e.g. with clay or some other white pigment) for aesthetic purposes, across the entirety of the visible surface of the paperboard, e.g. in the production facility where the paperboard is made. The paperboard is typically printed with indicia, decorative designs, or the like; however, this is typically not done at the paperboard mill but rather at a converter where the paperboard is also die cut, scored, and so on. Often, the paperboard is printed (on the aesthetic side, which will become the visible surface of the assembled frame) and is then overcoated with a protective clear coat or lacquer.

As noted, the frame pieces can be affixed to each other in any suitable manner. In many embodiments, adhesive bonding may be preferred. Any adhesive may be used, relying on any delivery system. In some embodiments a water-based adhesive composition may be used. In other embodiments a 100% solids composition, e.g. a hot-melt adhesive composition, may be used. Any such adhesive(s) may be applied e.g. to a wide area and/or in elongate, e.g. narrow, lines or beads of the general type mentioned elsewhere herein. Any such adhesive may be of any suitable composition, based e.g. on ethylene-vinyl acetate polymers and/or copolymers, styrenic block copolymers, acrylic and acrylate polymers, polyolefins, polyamides, polyesters, and so on. Such an adhesive may be used e.g. at any location at which an area of a first frame portion is closely abutted against an area of a second frame portion. In particular, such a location may be the area of overlap between a reinforcing plate 101 of a first frame portion and a corner-proximate bonding area 121 of an elongate inner sidewall of a second frame portion. Other potentially suitable bonding locations include e.g. areas of overlap between inner sidewalls of neighboring frame portions, between outer sidewalls of neighboring frame portions, and between an inner sidewall of a frame portion and an outer sidewall of a neighboring frame portion and vice versa. Other potentially suitable bonding locations include e.g. areas of overlap between upstream flanges of neighboring frame portions, between downstream flanges of neighboring frame portions, and between a downstream flange of a frame portion and an upstream flange of a neighboring frame portion and vice versa.

It is emphasized that all of the locations described above may be suitable for the placing of an adhesive; any such adhesive need not be placed in every one of these locations. Also, while the discussions above have primarily concerned bonding in order to attach neighboring frame portions to each other at corners of the frame, bonding may also be performed within an individual frame piece. For example, the upstream and downstream flanges of each frame piece may be adhesively bonded to each other along some or all of the elongate length of the frame piece, e.g. in order to further enhance the rigidity of the frame piece and the frame as a whole. In some locations, a border section 7 of filter media 5 may be present in such a location and may also be bonded in this manner.

Any suitable air filter media 5 may be used in filter 1. Air filter media 5 is typically sheet-like, with a length and width that are greater than the thickness of the air filter media and with an overall planar configuration (even if pleated). Although FIGS. 1-2 illustrate an air filter 1 comprising nonpleated filter media 5, any suitable filter media, including pleated media, may be used e.g., as in the exemplary arrangement of FIG. 7. In embodiments in which a pleated filter media is used, the pleats may be e.g. crushed flat in border section 7 of the filter media, so that border section 7 of the filter media can be compressed between the upstream and downstream flanges 30 and 60 of the perimeter frame in the general manner described earlier herein. In some embodiments, filter media 5 may comprise an electret-comprising nonwoven material. In some embodiments, filter media 5 may comprise a non-electret-comprising nonwoven material, e.g. fiberglass fibers.

In some embodiments, filter media 5 (whether pleated or in substantially flat state or otherwise), may include one or more layers comprising e.g. a porous media, a nonwoven scrim, and/or a set of reinforcing members such as e.g. filaments, a netting, a wire mesh, or any such structure(s), which may be provided along with the filter media (e.g., bonded thereto) and which may be made of any suitable material. If the filter media is pleated, such members may help stabilize the pleated structure. An exemplary reinforcing member 9 is visible in FIG. 7; in this particular exemplary arrangement reinforcing member 9 is bonded to the upstream pleat tips of the pleated filter media 5; however, any such member or members may be on the upstream or downstream side of the pleated filter media. In particular embodiments, filter media 5 may comprise reinforcing members in the form of reinforcing filaments of the general type described in U.S. Patent Application Publications US 2021/0229022 and 2021-0229023, both of which are incorporated by reference in their entirety herein. In other embodiments, no such reinforcing filaments, nettings, scrims, etc. of any kind are present on the filter media.

The arrangements disclosed herein may be implemented in any suitable manner. In some embodiments some or all such processes (e.g. folding of frame pieces to form frame portions, mounting of frame portions on edges of filter media, affixing ends of frame portions to ends of neighboring frame portions, affixing the filter media to the frame, and so on) may be performed manually. In some embodiments, some of all of such processes may be performed e.g. by robotic machinery. In some embodiments robotic machinery may perform any or all of the following operations: deposit elongate adhesive beads on hidden surfaces of selected panels of frame pieces (e.g., panels that will form upstream and downstream flanges of the finished frame); fold frame pieces into frame portions; mount frame portions onto the edges of filter media; bring together the ends of frame portions to form corners; and, hold the thus-formed frame in position for a sufficient time for the adhesive to harden.

EXAMPLES

Prototype compression frames were made of the general type illustrated in the Figures herein. The frames were nominal 20"×25"×1" and were made of kraft single-layer paperboard of a type commonly used to make compression frames for air filters. The Working Example frames comprised a reinforcing plate that extended from a downstream flange of one frame portion onto an inner sidewall of a neighboring frame portion (very similar to plate 101 as shown in FIG. 5) and was adhesively bonded thereto, at all four corners of the frame. The Working Example frames also comprised a reinforcing tab (similar to tab 47 as shown in FIG. 6) that extended integrally from an outer sidewall of one frame portion and wrapped outwardly onto an outer sidewall of the neighboring frame portion and was adhesively bonded thereto, at all four corners of the frame. In addition to this, various areas of the flanges and sidewalls of the frame portions were adhesively bonded to each other in the usual manner. The frames included an air filter media that was pinched between the upstream and downstream flanges and bonded in place. The sidewall angle, inclination angle, and angle of repose, of the frame portions was not quantitatively measured. In general, the frame portions exhibited a shape (when viewed in cross-section) that was somewhat intermediate between the shapes depicted in FIGS. 2 and 7.) There was some variation due e.g. to these being pilot-scale, limited-number prototypes. Adhesive was not present in the gap between the inner and outer sidewalls of each frame portion; that is, the sidewalls were not bonded to each other.

Comparative Examples of two types were made. The first type of Comparative Example was conventional compression frames in which various areas of the flanges and sidewalls were adhesively bonded to each other in the usual manner. Reinforcing tabs were also present and were bonded in similar manner as in the Working Example frames. The overall design, shape, size, etc. of these frames was the same as for the Working Example frames. This first type of Comparative Example was thus generally equivalent to the Working Examples except that no reinforcing plates were present.

The second type of Comparative Example was similar to the first type of Comparative Example, except that each corner of the frame included a stabilizing flap that extended from an inner sidewall of one frame portion onto an inner sidewall of a neighboring frame portion and was adhesively bonded thereto. These stabilizing flaps were present at all four corners of the frame. Reinforcing tabs were also present and were bonded in similar manner as in the Working Example frames. The overall design, shape, size, etc. of these frames was the same as for the Working Example frames. This second type of Comparative Example was thus generally equivalent to the Working Examples excepting that stabilizing flaps were used rather than the herein-disclosed reinforcing plates.

Thus in these Examples, evaluations were performed of Working Example compression frames in which the frame corners were braced by reinforcing plates that extended from downstream flanges to inner sidewalls of neighboring frame portions, in comparison to conventional compression frames (with no added corner-bracing) and in comparison to compression frames in which the frame corners were braced by stabilizing flaps that extended from inner sidewalls to inner sidewalls of neighboring frame portions.

Samples of the various framed air filters were mounted into a fixture and subjected to out-of-plane twisting forces; results were reported as Minimum Torque in inch-pounds. Multiple samples were evaluated and results averaged. The Comparative Example first type samples (conventional compression frames) exhibited an average Minimum Torque of approximately 12.7 inch-pounds. The Comparative Example second type samples (with stabilizing flaps) exhibited a slightly higher Minimum Torque, of approximately 13.2 inch-pounds. The Working Example samples exhibited a Minimum Torque of approximately 14.3 inch-pounds.

These results indicated that bracing frame corners by way of reinforcing plates as disclosed herein can provide resistance to out-of-plane twisting that is noticeably higher than that of conventional compression frames. Furthermore, bracing frame corners by reinforcing plates as disclosed herein is found to provide noticeably higher resistance to out-of-plane twisting than bracing frame corners by stabilizing flaps that extend between inner sidewalls of neighboring frame portions.

Working Example frames and framed air filters were also generated at a large-scale manufacturing facility using production equipment (although the frames and filters were produced on a limited-number, pilot scale). The frames and filters, as made, were very similar to those in the above-described Working Examples and exhibited similar behavior.

It will be apparent to those skilled in the art that the specific exemplary embodiments, elements, structures, features, details, arrangements, configurations, etc., that are disclosed herein can be modified and/or combined in numerous ways. It is emphasized that any embodiment disclosed herein may be used in combination with any other embodiment or embodiments disclosed herein, as long as the embodiments are compatible. While a limited number of exemplary combinations are presented herein, it is emphasized that all such combinations are envisioned.

Numerous variations and combinations are contemplated as being within the bounds of the conceived invention, not merely those representative designs that were chosen to serve as exemplary illustrations. Thus, the scope of the present invention is not limited to the specific illustrative structures described herein, but rather extends at least to the structures described by the language of the claims, and the equivalents of those structures. Any of the elements that are positively recited in this specification as alternatives may be explicitly included in the claims or excluded from the claims, in any combination as desired. Any of the elements or combinations of elements that are recited in this specification in open-ended language (e.g., comprise and derivatives thereof), are considered to additionally be recited in closed-ended language (e.g., consist and derivatives thereof) and in partially closed-ended language (e.g., consist essentially, and derivatives thereof). To the extent that there is any conflict or discrepancy between this specification and the disclosure in any document that is incorporated by reference herein but to which no priority is claimed, this specification as written will control.

What is claimed is:

1. A nestable framed air filter, comprising:

an air filter media comprising an at least generally rectangular perimeter with four major elongate edges;

and, a four-cornered frame comprising four elongate frame portions, each elongate frame portion being mounted on one of the four major elongate edges of the filter media and with pairs of neighboring frame portions meeting to form a corner of the four corners of the frame;

wherein each of the four elongate frame portions comprises an elongate inner sidewall and an elongate outer sidewall that meet at a sidewall junction, an elongate upstream flange that meets the elongate outer sidewall at an outer junction, and an elongate downstream flange that meets the elongate inner sidewall at an inner junction;

wherein for each frame portion, the elongate outer sidewall is oriented at an inclination angle Ω of from 110 to 160 degrees and the elongate outer sidewall and the elongate inner sidewall meet at the sidewall junction to form a sidewall angle o that is less than 30 degrees, and wherein the framed air filter is nestable;

and further wherein at least one corner of the four corners of the frame is a non-integral, bonded corner with a reinforcing plate that integrally extends from an end of an elongate downstream flange of a first frame portion of a pair of neighboring frame portions that meet to form the non-integral, bonded corner, with the reinforcing plate being in inward, substantially coplanar overlapping relation with, and being affixed to, a corner-proximate bonding area of an elongate inner sidewall of a second frame portion of the pair of neighboring frame portions, and with the proviso that the first frame portion of the pair of neighboring frame portions that meet to form the non-integral, bonded corner, comprises an elongate inner sidewall that terminates at the non-integral, bonded corner so that the non-integral, bonded corner does not comprise a stabilizing flap that integrally extends from the elongate inner sidewall of the first frame portion so as to be in inward, substantially coplanar overlapping relation with the corner-proximate bonding area of the elongate inner sidewall of the second, neighboring frame portion.

2. The nestable framed air filter of claim 1 wherein the reinforcing plate is integrally, foldably connected to the end of the elongate downstream flange of the first frame portion by a fold line that is aligned with a long axis of the inner junction of the elongate downstream flange and the elongate inner sidewall of the second, neighboring frame portion.

3. The nestable framed air filter of claim 2 wherein the inner junction between the elongate inner sidewall and elongate downstream flange of the second, neighboring frame portion exhibits an angle of repose of from 110 degrees to 160 degrees, and wherein the fold line between the reinforcing plate and the end of the elongate downstream flange from which the reinforcing plate integrally, foldably extends, exhibits a reinforcing plate angle that is at least generally congruent with the angle of repose of the inner junction of the second, neighboring frame portion.

4. The nestable framed air filter of claim 1 wherein an outward major surface of the reinforcing plate is adhesively bonded to the corner-proximate bonding area of the elongate inner sidewall of the second, neighboring frame portion.

5. The nestable framed air filter of claim 1 wherein at each non-integral, bonded corner of the frame, the elongate outer sidewall of the first frame portion of the pair of neighboring frame portions that meet to form the non-integral, bonded corner, comprises a reinforcing tab that extends integrally from the elongate outer sidewall and is foldably connected thereto, and wherein the reinforcing tab is in coplanar overlapping relation with, and is affixed to, a corner-proximate bonding area of the elongate outer sidewall of the second frame portion of the pair of neighboring frame portions that meet to form the non-integral, bonded corner.

6. The nestable framed air filter of claim 5 wherein the reinforcing tab integrally extends from, and is foldably connected, to, the elongate outer sidewall of the first frame portion by a tab fold line; and, wherein the corner-proximate bonding area is an area of an outward surface of the elongate outer sidewall of the second frame portion and wherein the reinforcing tab outwardly overlaps the corner-proximate bonding area of the outward surface of the elongate outer sidewall of the second frame portion and is adhesively bonded thereto.

7. The nestable framed air filter of claim 1 wherein all four corners of the frame are bonded corners and no corner of the frame is an integral corner, and wherein each of the four non-integral, bonded corners is configured so that the first frame portion of a pair of neighboring frame portions that forms the non-integral, bonded corner, comprises a reinforcing plate that integrally extends from an end of an elongate downstream flange of the first frame portion of the pair of neighboring frame portions that meet to form the non-integral, bonded corner, with the reinforcing plate being in inward, substantially coplanar overlapping relation with, and being affixed to, a corner-proximate bonding area of an elongate inner sidewall of a second frame portion of the pair of neighboring frame portions.

8. The nestable framed air filter of claim 7 wherein for each of the four bonded corners of the frame, the first frame portion of the pair of neighboring frame portions that form the bonded corner, comprises a reinforcing tab that extends integrally from the elongate outer sidewall of the first frame portion and is foldably connected thereto by a tab fold line, and wherein the reinforcing tab is in coplanar outwardly overlapping relation with, and is adhesively bonded to, a corner-proximate bonding area of the elongate outer sidewall of the second frame portion of the pair of neighboring frame portions.

9. The nestable framed air filter of claim 1 wherein the reinforcing plate is folded along a fold line with respect to the elongate downstream flange of the first frame portion, from which the reinforcing plate integrally extends.

10. The nestable framed air filter of claim 1 wherein for each elongate frame portion the elongate upstream flange, the elongate downstream flange, the elongate outer sidewall, and the elongate inner sidewall, are all integral with each other.

11. The nestable framed air filter of claim 1 wherein each of the four frame portions is provided by a separately-made frame piece, which four frame pieces are assembled together to form the frame with each frame piece providing one frame portion, such that all four corners of the frame are bonded corners and no corner of the frame is an integral corner.

12. The framed air filter of claim 11 wherein a first pair of opposing frame pieces of the four frame pieces each comprises first and second reinforcing plates that integrally extend from opposing ends of a downstream flange of the frame piece; and, wherein the first pair of opposing frame pieces each further comprises first and second reinforcing tabs that integrally extend from opposing ends of an outer sidewall of the frame piece.

13. The framed air filter of claim 12 wherein a second pair of opposing frame pieces, which are arranged around the perimeter of the filter media in alternating sequence with the first pair of opposing frame pieces, do not comprise any reinforcing plates and do not comprise any reinforcing tabs.

14. The framed air filter of claim 13 wherein the second pair of opposing frame pieces each comprise opposing ends exhibiting terminal edges that are aligned within plus or minus 20 degrees of perpendicular to a long axis of the frame piece, along the entirety of each terminal edge.

15. The framed air filter of claim 14 wherein the first pair of opposing frame pieces each comprise opposing ends exhibiting terminal edges that are aligned within plus or minus 20 degrees of perpendicular to the long axis of the frame piece along the entirety of each terminal edge, except for along the reinforcing tab that extends from the outer sidewall panel.

16. A method of making a portion of a frame for a framed air filter, the method comprising:

folding first and second frame pieces to form first and second frame portions, each frame portion comprising an elongate inner sidewall and an elongate outer sidewall that meet at a sidewall junction, an elongate upstream flange that meets the elongate outer sidewall at an outer junction, and an elongate downstream flange that meets the elongate inner sidewall at an inner junction;

mounting the first and second frame portions on first and second edges of a sheet of filter media so that an end of the first frame portion and an end of the second frame portion meet to define a corner of the frame;

positioning a reinforcing plate that integrally extends from an end of an elongate downstream flange of the first frame portion and is foldably connected thereto by a fold line, so that the reinforcing plate is in inward, substantially coplanar overlapping relation with at least a corner-proximate bonding area of the elongate inner sidewall of the second frame portion;

and, affixing the reinforcing plate to the corner-proximate bonding area.

17. The method of claim 16 wherein the method is performed to make all four corners of the frame.

* * * * *